United States Patent
Guo

(10) Patent No.: US 11,036,335 B2
(45) Date of Patent: Jun. 15, 2021

(54) METHOD, APPARATUS AND STORAGE MEDIUM FOR CALIBRATING CAPACITIVE TOUCH MODULE

(71) Applicant: BEIJING XIAOMI MOBILE SOFTWARE CO., LTD., Beijing (CN)

(72) Inventor: Hengjun Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,448

(22) Filed: Nov. 29, 2019

(65) Prior Publication Data

US 2021/0055823 A1 Feb. 25, 2021

(30) Foreign Application Priority Data

Aug. 19, 2019 (CN) .......................... 201910765340.6

(51) Int. Cl.
| | |
|---|---|
| *G06F 3/041* | (2006.01) |
| *G06F 3/044* | (2006.01) |
| *G06F 3/048* | (2013.01) |
| *G06F 11/07* | (2006.01) |

(Continued)

(52) U.S. Cl.
CPC ............ *G06F 3/0418* (2013.01); *G06F 3/044* (2013.01); *G06F 3/0412* (2013.01); *H04M 1/2473* (2013.01)

(58) Field of Classification Search
CPC ......... G06F 3/0412–0418; G06F 3/044; G06F 11/07–32; G06F 3/041; H04M 1/2473
See application file for complete search history.

(56) References Cited

U.S. PATENT DOCUMENTS

| | | | |
|---|---|---|---|
| 2013/0328823 A1 | 12/2013 | Liu et al. | |
| 2014/0292705 A1* | 10/2014 | Tan | ........................ G06F 3/0418 345/174 |

(Continued)

FOREIGN PATENT DOCUMENTS

| | | | | | |
|---|---|---|---|---|---|
| CN | 106527802 A | * | 3/2017 | ............. | G06F 3/041 |
| CN | 106557240 A | * | 4/2017 | ........... | G06F 3/0484 |
| CN | 106909272 A | * | 6/2017 | ........... | G06F 3/0481 |

(Continued)

OTHER PUBLICATIONS

Extended European Search Report in Application No. 20153703.2, dated Aug. 17, 2020.

*Primary Examiner* — Lin Li
(74) *Attorney, Agent, or Firm* — Syncoda LLC; Feng Ma

(57) ABSTRACT

A method for calibrating a capacitive touch module includes: acquiring, for any of touch regions, touch parameters of the touch nodes in the touch region; determining whether the touch region is an abnormal touch region based on the touch parameters; and correcting the touch parameters of the touch nodes in the abnormal touch region based on the touch parameters, if the touch region is the abnormal touch region, so as to enable the touch parameters of the touch nodes in the abnormal touch region to be within a preset normal range. After the abnormal touch region of the touch module is determined, the touch parameters of the touch nodes in the abnormal touch region are corrected based on the acquired touch parameters so as to be within the preset normal range, thereby reducing the probability of abnormality of the touch module.

17 Claims, 11 Drawing Sheets

(51) Int. Cl.
*G06F 11/32* (2006.01)
*H04M 1/247* (2021.01)

(56) References Cited

U.S. PATENT DOCUMENTS

2015/0185951 A1* 7/2015 Akai .................... G06F 3/0418
                                                                345/174
2017/0357372 A1* 12/2017 Morimoto ............. G06F 3/0446

FOREIGN PATENT DOCUMENTS

| CN | 108121631 A | * | 6/2018 | ............. G06F 11/32 |
| CN | 109739679 A | * | 5/2019 | ............. G06F 11/07 |
| CN | 109918247 A | * | 6/2019 | ............. G06F 3/041 |
| CN | 110134295 A |   | 8/2019 | |
| EP | 3082024 A1  |   | 10/2016 | |

* cited by examiner

| 5 | 25 | 11 |
|---|----|----|
| 4 | 23 | 10 |
| 5 | 26 | 10 |
| 2 | 30 | 12 |
| 5 | 36 | 10 |
| 0 | 35 | 8 |
| 2 | 40 | 10 |
| 1 | 43 | 9 |
| 5 | 48 | 10 |
| 6 | 49 | 8 |

FIG. 8

| 1 | -11 | 1 |
|---|-----|---|
| 0 | -13 | 0 |
| 1 | -10 | 0 |
| 2 | -6  | 2 |
| 1 | 0   | 0 |
| 4 | 1   | -2 |
| 2 | 4   | 0 |
| 3 | 7   | 1 |
| 1 | 12  | 0 |
| 2 | 13  | -2 |

FIG. 9

| 5 | 0 | 11 |
|---|----|----|
| 4 | 23 | 10 |
| 5 | 26 | 10 |
| 2 | 30 | 12 |
| 5 | 36 | 10 |
| 0 | 35 | 8 |
| 2 | 40 | 10 |
| 1 | 43 | 9 |
| 5 | 48 | 10 |
| 6 | 49 | 8 |

FIG. 10

METHOD, APPARATUS AND STORAGE MEDIUM FOR CALIBRATING CAPACITIVE TOUCH MODULE

CROSS-REFERENCE TO RELATED APPLICATION

This application claims priority to Chinese Patent Application 201910765340.6 filed on Aug. 19, 2019, the disclosure of which is hereby incorporated by reference in its entirety.

BACKGROUND

With the advancement of technologies, more and more mobile phones adopt touch screens, and users can operate mobile phones directly by clicking the touch screen.

When a mobile phone with a touch screen is used, abnormal phenomena such as reduction of sensitivity, frozen screen or automatic accidental touch and the like may occur to the touch screen such that the normal use of the mobile phone is affected.

SUMMARY

The present disclosure relates generally to the technical fields of an electronic device, and more specifically to a method, apparatus and a storage medium for calibrating a capacitive touch module.

According to a first aspect of embodiments of the present disclosure, there is provided a method for calibrating a capacitive touch module. The touch module includes a plurality of touch regions. The touch region includes a plurality of touch nodes. The method includes:

acquiring, for any of the touch regions, touch parameters of the touch nodes in the touch region;

determining whether the touch region is an abnormal touch region on the basis of the touch parameters; and correcting the touch parameters of the touch nodes in the abnormal touch region on the basis of the touch parameters if the touch region is the abnormal touch region, so as to enable the touch parameters of the touch nodes in the abnormal touch region to be within a preset normal range.

In some embodiments, the process of determining whether the touch region is the abnormal touch region on the basis of the touch parameters includes:

determining whether a number of the touch nodes whose touch parameters are within a preset abnormal range is greater than or equal to a first threshold, and if the number is greater than or equal to the first threshold, determining that the touch region is the abnormal touch region.

In some embodiments, the process of determining whether the touch region is the abnormal touch region on the basis of the touch parameters includes:

determining whether a first number of the touch nodes whose touch parameters are within a preset abnormal range is greater than or equal to a first threshold, and whether a second number of the touch nodes meeting a preset condition is greater than a second threshold, the preset condition including that a difference value between the touch parameters of the adjacent touch nodes is less than or equal to a third threshold; and if the first number is greater than or equal to the first threshold and the second number is greater than the second threshold, determining that the touch region is the abnormal touch region.

In some embodiments, the process of acquiring the touch parameters of the touch nodes in the touch region includes:

acquiring a parameter value representing a size of a capacitance of the touch node; and using a result obtained by subtracting a reference value from the parameter value as the touch parameters.

In some embodiments, before the process of using the result obtained by subtracting the reference value from the parameter value as the touch parameters, the method further includes:

acquiring a plurality of historical parameter values which represent the size of the capacitance of the touch nodes and are within the preset normal range; and calculating an average value of the plurality of historical parameter values, and setting the average value of the plurality of historical parameter values as the reference value.

In some embodiments, after the process of correcting the touch parameters of the touch nodes in the abnormal touch region on the basis of the touch parameter, the method further includes:

determining whether the corrected abnormal touch region is still an abnormal touch region; and calibrating the corrected touch parameters of the touch nodes in the abnormal touch region on the basis of the reference value if the corrected abnormal touch region is still the abnormal touch region, so as to enable the calibrated touch parameters to be within the preset normal range.

In some embodiments, the process of correcting the touch parameters of the touch nodes in the abnormal touch region on the basis of the touch parameters includes:

calculating an average value of the touch parameters of the touch nodes in the abnormal touch region, of which the parameter values are within the preset abnormal range; and subtracting the average value from the touch parameters of the touch nodes in the abnormal touch region, of which the parameter values are within the preset abnormal range.

According to a second aspect of embodiments of the present disclosure, there is provided an apparatus for calibrating a capacitive touch module. The touch module includes a plurality of touch regions. The touch region includes a plurality of touch nodes. The apparatus includes:

a first acquiring module, configured to acquire touch parameters of the touch nodes in the touch region for any one touch region;

a first determining module, configured to determine whether the touch region is an abnormal touch region on the basis of the touch parameter; and a correcting module, configured to correct the touch parameters of the touch nodes in the abnormal touch region on the basis of the touch parameter, when the touch region is the abnormal touch region, so as to enable the touch parameters of the touch nodes in the abnormal touch region to be within a preset normal range.

In some embodiments, the first determining module includes:

a first determining sub-module, configured to determine whether a number of the touch nodes whose touch parameters are within a preset abnormal range is greater than or equal to a first threshold, and when the number is greater than or equal to the first threshold, and determine that the touch region is the abnormal touch region.

In some embodiments, the first determining module includes:

a second determining sub-module, configured to: determine whether a first number of the touch nodes whose touch parameters are within a preset abnormal range is greater than or equal to a first threshold, and whether a second number of the touch nodes meeting a preset condition is greater than a second threshold, the preset condition including that a difference value between the touch parameters of the adjacent touch nodes is less than or equal to a third threshold; and when the first number is greater than or equal to the first threshold and the second number is greater than the second threshold, determine that the touch region is the abnormal touch region.

In some embodiments, the first acquiring module includes:

an acquiring sub-module, configured to acquire a parameter value representing a size of a capacitance of the touch node; and a setting sub-module, configured to use a result obtained by subtracting a reference value from the parameter value as the touch parameter.

In some embodiments, the apparatus further includes:

a second acquiring module, configured to acquire a plurality of historical parameter values which represent the size of the capacitance of the touch node and are within the preset normal range; and a calculating setting module, configured to calculate an average value of the plurality of historical parameter values, and set the average value of the plurality of historical parameter values as the reference value.

In some embodiments, the apparatus further includes:

a second determining module, configured to determine whether the corrected abnormal touch region is still an abnormal touch region; and a calibrating module, configured to, calibrate on the corrected touch parameters of the touch nodes in the abnormal touch region on the basis of the reference value, when the corrected abnormal touch region is still the abnormal touch region, so as to enable the calibrated touch parameters to be within the preset normal range.

In some embodiments, the correcting module includes:

a calculating sub-module, configured to calculate an average value of the touch parameters of the touch nodes in the abnormal touch region, of which the parameter values are within the preset abnormal range; and a regulating sub-module, configured to subtract the average value from the touch parameters of the touch nodes in the abnormal touch region, of which the parameter values are within the preset abnormal range.

According to a third aspect of embodiments of the present disclosure, there is provided an apparatus for calibrating a capacitive touch module, including:

a processor; and a memory for storing instructions executable by the processor;

wherein the processor is configured to:

acquire touch parameters of a touch node in a touch region for any one touch region;

determine whether the touch region is an abnormal touch region on the basis of the touch parameter; and correct the touch parameters of the touch nodes in the abnormal touch region on the basis of the touch parameters if the touch region is the abnormal touch region, so as to enable the touch parameters of the touch nodes in the abnormal touch region to be within a preset normal range.

According to a fourth aspect of embodiments of the present disclosure, there is provided a computer-readable storage medium having stored thereon computer program instructions, when the computer program instructions are executed by a processor, the steps of the method for calibrating the capacitive touch module, as provided in the first aspect of the present disclosure are implemented.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 3 is a schematic diagram of touch parameters of a touch module, according to some embodiments.

FIG. 4 is another schematic diagram of touch parameters of a touch module, according to some embodiments.

FIG. 5 is yet another schematic diagram of touch parameters of a touch module, according to some embodiments.

FIG. 8 is still a further schematic diagram of touch parameters of a touch module, according to some embodiments.

FIG. 9 is still another schematic diagram of touch parameters of a touch module, according to some embodiments.

FIG. 10 is still another schematic diagram of touch parameters of a touch module, according to some embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
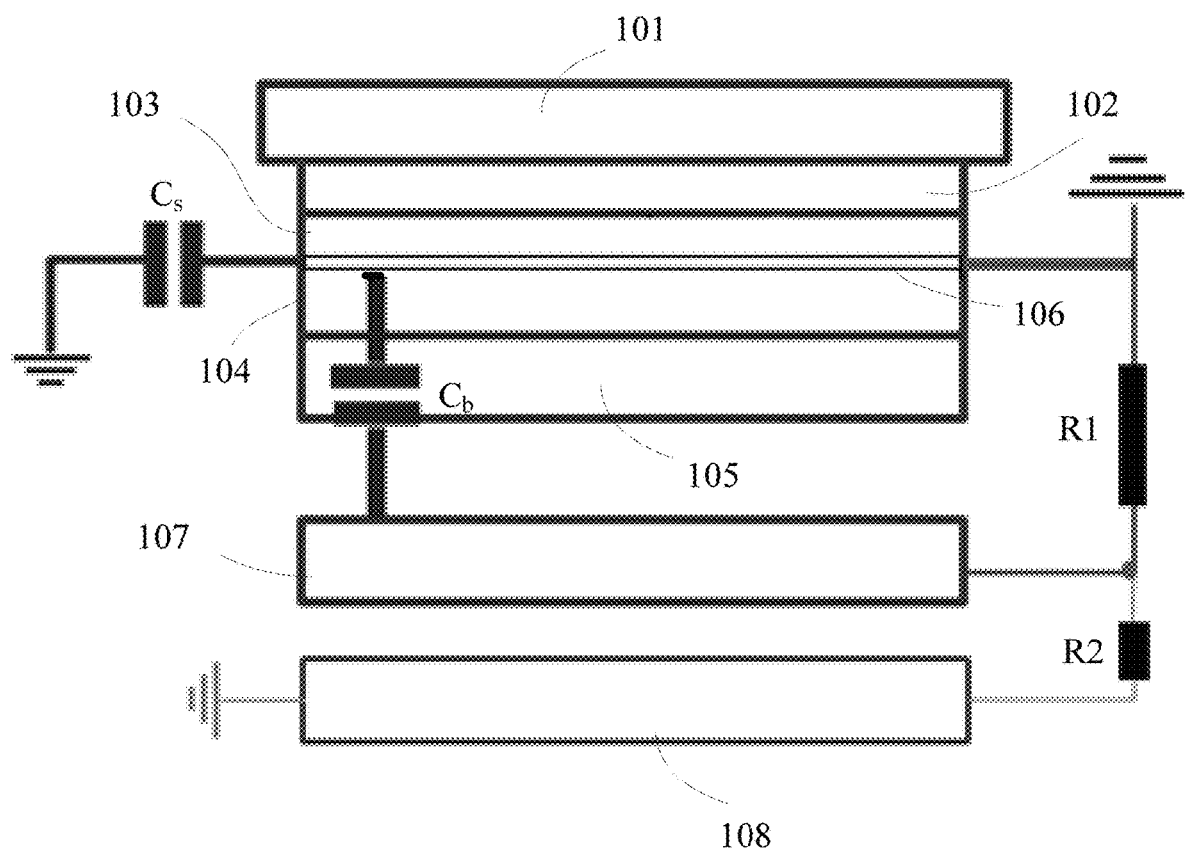
FIG. 1 is a schematic diagram of a structure of a touch module, according to some embodiments.

FIG. 1 is a schematic diagram of a structure of a touch module, according to some embodiments. As shown in FIG. 1, the touch module sequentially includes cover glass 101, a polarizer 102, a color filter 103, thin film transistor glass 104 and a back light module 105 from top to bottom, in which a touch layer 106 including a plurality of touch nodes is disposed between the color filter 103 and the thin film transistor glass 104, and by taking a mobile phone as an example, touch nodes with a size of 18 columns×32 rows can be respectively disposed along a width direction and a length direction of the mobile phone.

By analyzing the model, it can be found that there is a first coupling capacitor $C_s$ between the touch node and other conductors in the touch module, there is a second coupling capacitor $C_b$ between the touch node and a metal frame 107 for fixing the touch module to surround the touch module, in one embodiment, the metal frame 107 is grounded by a conductive adhesive, the metal frame 107 is also connected to a grounded middle frame 108 by conductive foam, since the conductive adhesive and the conductive foam have relatively high resistances, as shown in FIG. 1, a resistor in a path where the metal frame 107 is grounded by the conductive adhesive can be equivalent to a first resistor R1, and a resistor in a path where the metal frame 107 is grounded by the middle frame 108 and the conductive foam can be equivalent to a second resistor R2.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Figure 2:
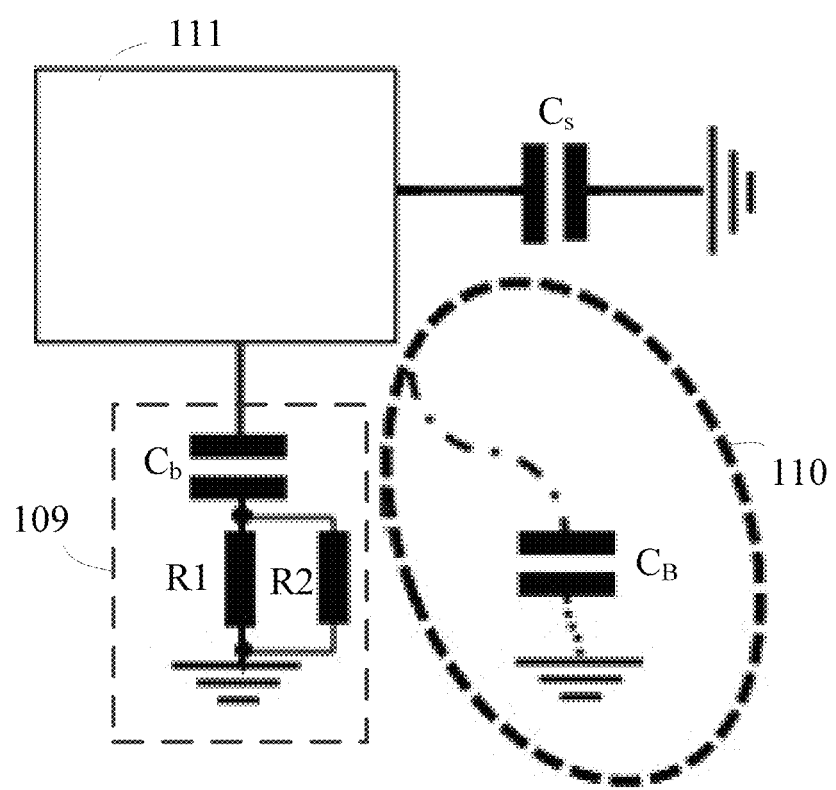
FIG. 2 is an equivalent circuit diagram of the touch module as shown in FIG. 1.

Further, a model where the touch module in FIG. 1 is located can be equivalent to a circuit diagram as shown in FIG. 2. As shown in FIG. 2, in a path 109, the touch node 111 is grounded by the second coupling capacitor $C_b$ and the first resistor R1 and the second resistor R2 which are connected in parallel mutually, herein, the second coupling capacitor $C_b$ is connected in series with the first resistor R1 and the second resistor R2 which are connected in parallel mutually. An impedance of the path 109 is as follows:

$$Z = \frac{R1 \cdot R2}{R1 + R2} + \frac{1}{jwC_b}$$

where Z represents an impedance value of the path 109, R1 represents a resistance value of the first resistor, R2 represents a resistance value of the second resistor, j represents an imaginary unit, w represents an angular frequency, and $C_b$ represents a capacitance value of the second coupling capacitor.

As shown in FIG. 2, the path 109 can be equivalent to an equivalent path 110 only including an equivalent capacitor $C_B$, and an impedance of the equivalent path 110 is as follows:

$$Z = \frac{1}{jwC_B}$$

where Z represents an impedance value of the equivalent path 110, j represents an imaginary unit, w represents an angular frequency, and $C_B$ represents a capacitance value of the equivalent capacitor.

In some embodiments, the corresponding touch parameter of the touch node is calculated as follows:

Diff=Rawdata−Baseline where Diff represents the touch parameter, Rawdata represents a voltage parameter corresponding to a capacitance value detected by the touch node, and Baseline represents a reference value.

Figure 3:
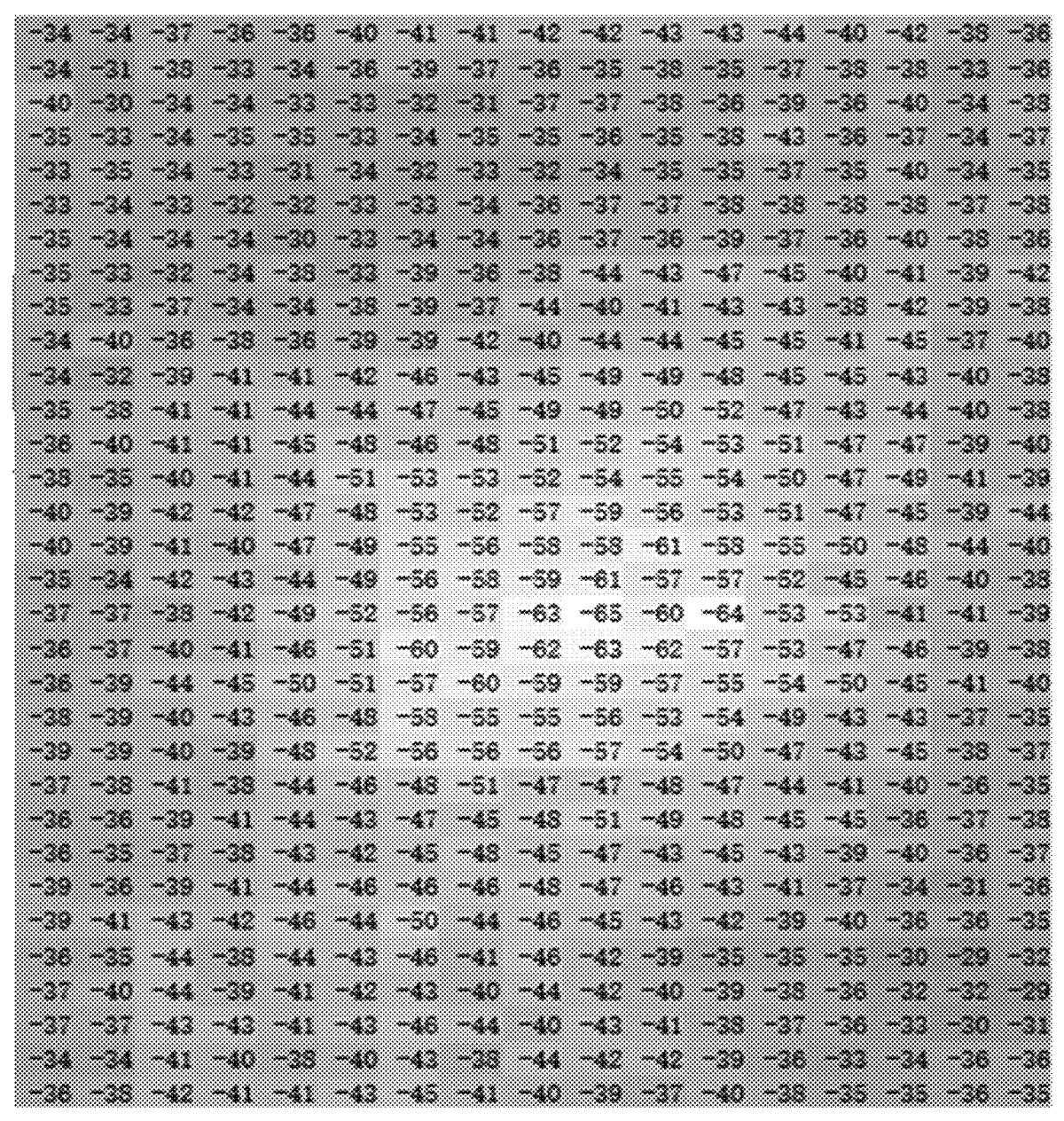

The capacitance value sensed by the touch node is $C_{total}=C_b+C_s$, and Rawdata has a positive correlation relationship with $C_{total}$. When the path where the first resistor R1 or the second resistor R2 is located is poorly grounded, the corresponding first resistor R1 or the second resistor R2 are increased, resulting in that the impedance Z is increased, so that the equivalent capacitor $C_B$ is reduced, the capacitance value $C_{total}$ detected by each touch node is reduced, the corresponding Rawdata is reduced, and a case that the touch parameter Diff of the whole touch module is less than 0 as shown in FIG. 3 can appear. At the moment, if a finger touches the touch module, a signal generated by the finger is offset, and for example, assuming that the finger touches the touch module when a system determines that the touch parameter Diff of the touch node is greater than 40, the touch of the finger for the touch module can increase Rawdata by 50, but in the case as shown in FIG. 3, even though the touch parameter Diff is increased by 50, it also cannot exceed the threshold of 40, so that the system cannot determine that the finger touches the touch module, and sensitivity of the touch module is reduced.

Figure 4:
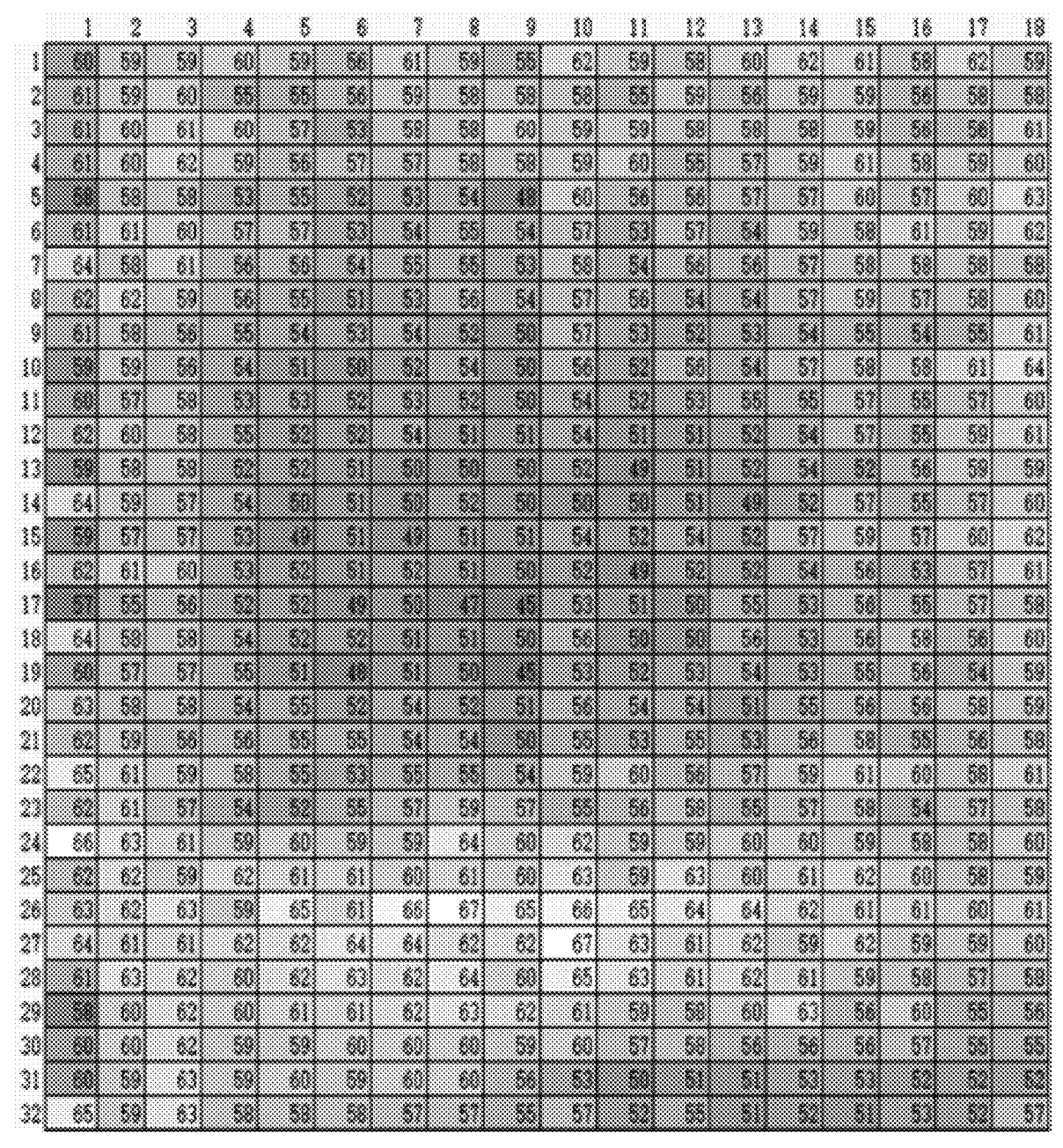

If Baseline is obtained on the basis of the touch parameter Diff, decrease of Diff can cause decrease of Baseline, if grounding is excellent at a next time point when Baseline is decreased, Rawdata is increased and thus the obtained touch parameter Diff is increased, then a case as shown in FIG. 4 occurs, and when the touch parameters of each touch node are too large, the system proceeds to a frozen screen mode, that is, does not make response to the acquired touch parameter. It should be noted that in FIG. 4, one column of numbers on the leftmost side represent the number of rows of the touch nodes, one row of numbers on the uppermost side represent the number of columns of the touch nodes, and other numbers represent the touch parameters corresponding to the touch nodes.

Figure 5:
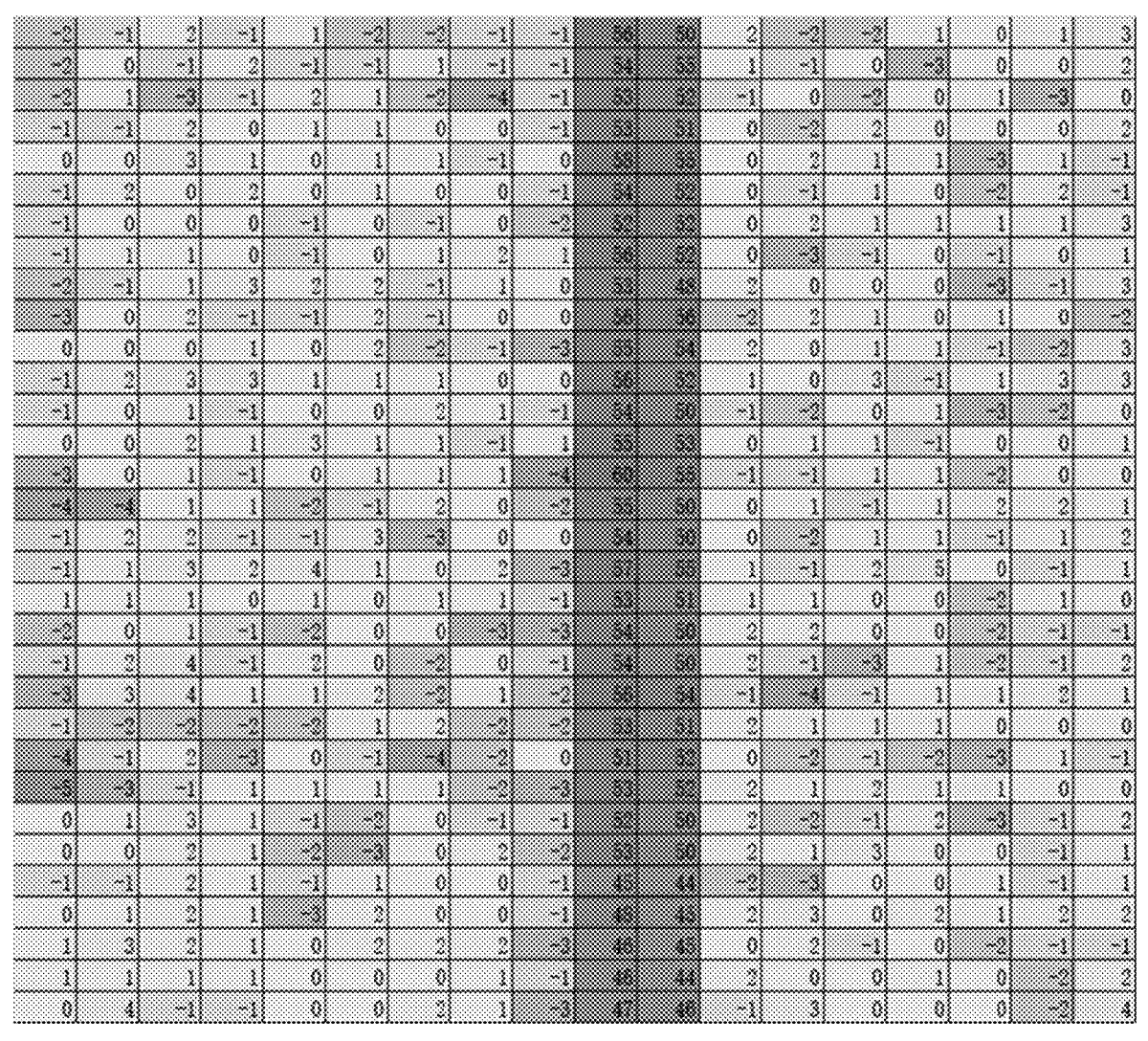

Moreover, as shown in FIG. 5, unstable grounding also can cause a case of automatically reporting ghost points for touches by mistake. As shown in FIG. 5, the touch parameters on a tenth column and an eleventh column from left to right are abnormally increased, and thus, the system may consider that the finger touches the regions where the two columns are located, which results in false touches.

Figure 6:
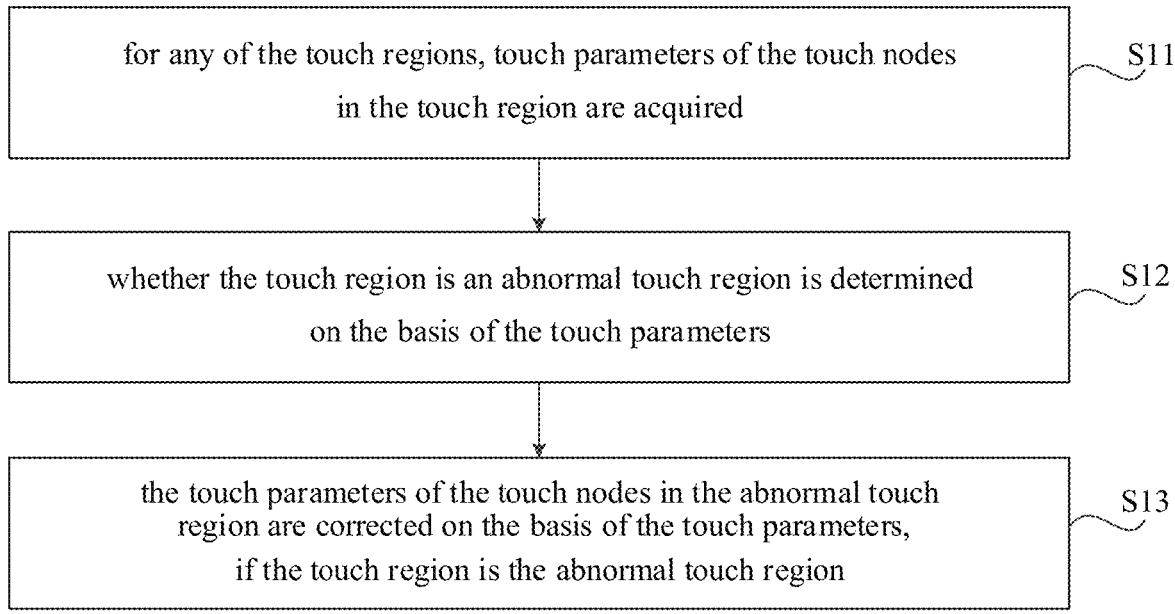
FIG. 6 is a flowchart of a method for calibrating a capacitive touch module, according to some embodiments.

In order to solve the above-mentioned problems, embodiments of the present disclosure provide a method for calibrating a capacitive touch module. The method can be used for the touch module as shown in FIG. 1, the touch module includes a plurality of touch regions, the touch region includes a plurality of touch nodes, and as shown in FIG. 6, the method includes:

In step S11, for any of the touch regions, touch parameters of the touch nodes in the touch region are acquired.

In step S12, whether the touch region is an abnormal touch region is determined on the basis of the touch parameters.

In step S13, the touch parameters of the touch nodes in the abnormal touch region is corrected on the basis of the touch parameters, if the touch region is the abnormal touch region, so as to enable the touch parameters of the touch nodes in the abnormal touch region to be within a preset normal range.

In some embodiments of the present disclosure, the touch node can be a sensor for detecting a capacitance value, and the touch parameter can be a parameter value representing a size of the capacitance value of the touch node. The touch region can be one column or one row in the touch nodes arranged in an array, and also can be a plurality of columns of touch nodes or a plurality of rows of touch nodes continuously distributed in the touch nodes arranged in an array.

In the step S11 of acquiring the touch parameters of the touch nodes in the touch region, scanning can be sequentially carried out according to a certain sequence to acquire the touch parameters of the touch nodes in each touch region. For example, in a touch module implemented on the basis of a Touch and Display Driver Integration (TDDI) architecture, a plurality of touch nodes are arranged in an array, each column of touch nodes forms one touch region, and the system acquires the touch parameters of each column of touch nodes at an interval of a certain time according to a certain sequence (e.g., a sequence from left to right).

After the above-mentioned touch parameters are acquired, the step S12 of determining whether the touch region is the abnormal touch region on the basis of the touch parameters is executed. The touch parameters reflect the size of the capacitance value of the corresponding touch node, and according to the actual use condition, in the normal case, the touch parameters of the touch nodes have relatively stable distribution, for example, the size of the capacitance value is located in a certain region, and thus, whether the corresponding touch region is the abnormal touch region can be determined on the basis of the touch parameters.

In order to determine the abnormal touch region, in some embodiments, the process of determining whether the touch region is the abnormal touch region on the basis of the touch parameters includes:

determining whether a number of the touch nodes whose touch parameters are within a preset abnormal range is greater than or equal to a first threshold, and if the number is greater than or equal to the first threshold, determining that the touch region is the abnormal touch region.

Following the above-mentioned example, the number of columns of the touch nodes arranged in an array is 18 columns, the number of rows of the touch nodes arranged in an array is 32 rows, it is assumed that the preset abnormal range is less than −20 or greater than 20 and the first threshold is 10, if for one touch region, that is, one column of touch nodes in the above-mentioned example, where the number of the touch nodes whose touch parameters are less than −20 or greater than 20 is 15, and 15 is greater than the first threshold of 10, the touch region is determined as the abnormal touch region. Generally, when the touch operation is carried out, the finger only touches one part of the touch region to enable the touch parameters of part of the touch nodes to be increased and within a normal range representing that the touch nodes are touched by the finger, the normal range generally is the same with the preset abnormal range, and whether the nodes are in a normal state or an abnormal state can be distinguished by the distribution of the touch nodes located in the normal range or the preset abnormal range. In the case that the normal range is the same with the preset abnormal range, the touch parameters are within the preset abnormal range, which may be caused by normal touch of the finger, or may be caused by abnormalities of the touch module.

In the case of failure, frozen screen or ghost points of the touch module, the number of the touch nodes whose touch parameters are within the preset abnormal range is increased with respect to the number of the touch nodes whose touch parameters are within the preset abnormal range due to the normal touch of the finger, and thus, the abnormal touch region can be determined by setting the first threshold and comparing the number of the touch nodes whose touch parameters are within the preset abnormal range to the size of the first threshold, so that the abnormal touch region can be more accurately found. It should be noted that the preset abnormal range and the first threshold can be set according to actual conditions, and the present disclosure does not make any specific limit thereto.

In some embodiments, the process of determining whether the touch region is the abnormal touch region on the basis of the touch parameters includes:

determining whether a first number of the touch nodes whose touch parameters are within a preset abnormal range is greater than or equal to a first threshold and whether a second number of the touch nodes meeting a preset condition is greater than a second threshold, the preset condition including that a difference value between the touch parameters of the adjacent touch nodes is less than or equal to a third threshold; and if the first number is greater than or equal to the first threshold and the second number is greater than the second threshold, determining that the touch region is the abnormal touch region.

Specifically, in addition to determining whether the first number of the touch nodes whose touch parameters are within the preset abnormal range is greater than or equal to the first threshold, a number of the touch nodes in which the difference value between the touch parameters of the adjacent touch nodes are less than or equal to the third threshold is also counted, which is the second number, and whether the second number is greater than the second threshold is determined.

Following the above-mentioned example, assuming that the second threshold is 20 and the third threshold is 12, it is determined whether the number of the touch nodes in one column of touch nodes, of which the touch parameters are less than −20 or greater than 20, is greater than or equal to the first threshold of 10, the number of the touch nodes in the column of touch nodes, in which the difference values between the touch parameters of the upper and lower adjacent touch nodes are less than or equal to 12, is counted, it is determined whether the number is greater than the second threshold of 20, and when both determinations are satisfied, the touch region is determined as the abnormal touch region. Referring to situations shown in FIG. 3 to FIG. 5, when the touch module has the above-mentioned abnormalities, the touch parameter of the adjacent touch nodes mostly may be increased or decreased together, and the abnormal touch region is determined in this way such that the accuracy can be increased. It should be noted that the second threshold and the third threshold can be set according to actual conditions, and the present disclosure does not make any specific limit thereto.

In the step S13, if the touch region is the abnormal touch region, the touch parameters of the touch nodes in the abnormal touch region is corrected on the basis of the touch parameters so as to be within the preset normal range. The touch parameters of the touch nodes in the abnormal touch region include difference value information with respect to the preset normal range, and thus, the related difference value information can be directly or indirectly acquired on the basis of the touch parameters in the abnormal touch region, and then the touch parameters are corrected according to the difference value information. It should be noted that the preset normal range can be set according to actual conditions, and the present disclosure does not make any specific limit thereto.

By the above-mentioned technical solution, the touch parameters of the touch nodes in the touch region are acquired; whether the touch region is the abnormal touch region is determined on the basis of the touch parameters; and if the touch region is the abnormal touch region, the touch parameters of the touch nodes in the abnormal touch region are corrected on the basis of the touch parameters so as to be within the preset normal range. Namely, after the abnormal touch region of the touch module is determined, the touch parameters of the touch nodes in the abnormal touch region are corrected on the basis of the acquired touch parameters so as to be within the preset normal range, thereby reducing a probability of abnormality of the touch module.

Figure 7:
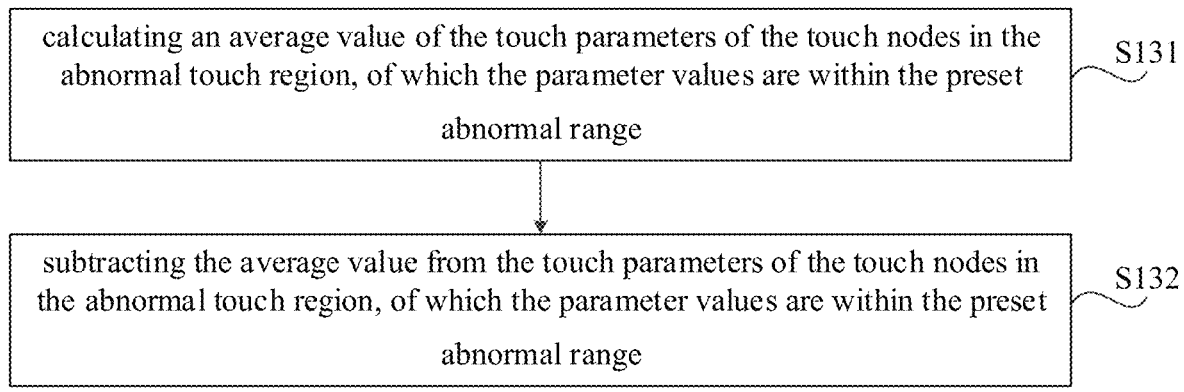
FIG. 7 is a flowchart of steps included in a method for calibrating a capacitive touch module, which correct touch parameters of touch nodes in an abnormal touch region on the basis of the touch parameters, according to some embodiments.

In some embodiments, as shown in FIG. 7, the process of correcting the touch parameters of the touch nodes in the abnormal touch region on the basis of the touch parameters includes:

In step S131, calculating an average value of the touch parameters of the touch nodes in the abnormal touch region, of which the parameter values are within the preset abnormal range.

In step S132, subtracting the average value from the touch parameters of the touch nodes in the abnormal touch region, of which the parameter values are within the preset abnormal range.

For example, referring to FIG. 8 to FIG. 9, assuming that a second column of touch nodes from left to right in FIG. 8 is determined as the abnormal touch region and the touch parameters of all the touch nodes on this column are within the preset abnormal range, firstly, the touch parameters of the second column of touch nodes from left to right in FIG. 8 are acquired, then an arithmetic average value of the touch parameters of this column is calculated so as to obtain the average value of 35.5 of the touch parameters of the second column from left to right in FIG. 8, in order to facilitate calculation, rounding is carried out to obtain a value of 36, and further, 36 is subtracted from the touch parameters of the second column of touch nodes from left to right in FIG. 8 so as to obtain the processed touch parameters of a second column of touch nodes in FIG. 9. Therefore, at least part of the touch parameters in the abnormal touch region can be made within the preset normal range to reduce the occurrence of the abnormal conditions of the touch module, such that the determining of the touch is more accurate.

Certainly, in other possible embodiments, for the touch nodes in a certain abnormal touch region, if only the touch parameters of part of the touch nodes are within the preset abnormal range, it is calculated only an average value of the touch parameters of the touch nodes whose parameter values are within the preset abnormal range, and the average value is only subtracted from the touch parameters of the touch nodes whose parameter values are within the preset abnormal range. For example, as shown in FIG. 10, if a second column of touch nodes from left to right in FIG. 10 is determined as the abnormal touch region, and a first number of this column from top to bottom is 0 and is within the preset normal range, when an average value of the touch parameters of this column is calculated, the first number of this column from top to bottom is excluded, it is calculated only an average value from a second number to a last number of this column from top to bottom, and the average value is subtracted from the second number to the last number of this column from top to bottom so as to obtain the corrected touch parameters.

Moreover, in one possible embodiment, even though the first and third columns of touch nodes from left to right in FIG. 8 are not determined as the abnormal touch regions, as long as the two columns of touch nodes are not touched by the finger, it is also performed, by referring to the above-mentioned mode, the operations of calculating the average value and subtracting the average value on the first and third columns of touch nodes from left to right in FIG. 8, so that the touch parameters of the two columns of touch nodes are approximate, which is convenient for later calculation.

Figure 11:
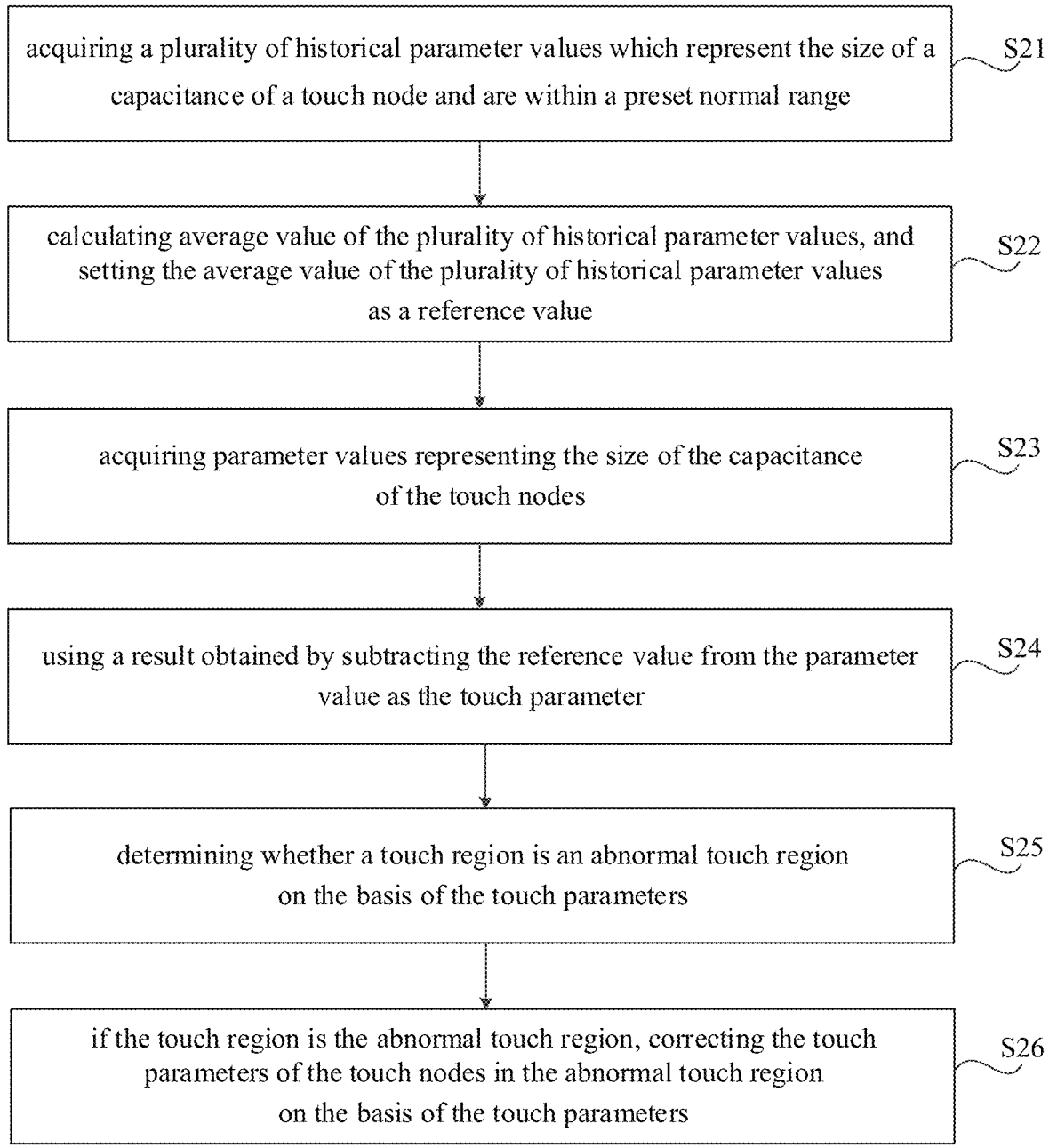
FIG. 11 is another flowchart of a method for calibrating a capacitive touch module, according to some embodiments.

FIG. 11 is another flowchart of a method for calibrating a capacitive touch module, according to some embodiments. As shown in FIG. 11, the method includes:

In step S21, a plurality of historical parameter values which represent the size of a capacitance of a touch node and are within a preset normal range are acquired.

In step S22, an average value of the plurality of historical parameter values is calculated, and the average value of the plurality of historical parameter values is set as a reference value.

In step S23, parameter values representing the size of the capacitance of the touch nodes are acquired.

In step S24, a result obtained by subtracting the reference value from the parameter values is used as the touch parameters.

In step S25, whether a touch region is an abnormal touch region on the basis of the touch parameters is determined.

In step S26, the touch parameters of the touch nodes in the abnormal touch region are corrected on the basis of the touch parameters, if the touch region is the abnormal touch region, so as to enable the touch parameters of the touch nodes in the abnormal touch region to be within the preset normal range.

In the step S21, a plurality of historical parameter values which represent the size of the capacitance of the touch nodes and are within the preset normal range are acquired, that is, a plurality of parameter values in a period of historical time, which represent the size of the capacitance of the touch node, can be acquired, and those parameter values are within the preset normal range, and for example, for a touch module with a refresh rate of 120 Hz, a parameter value representing the size of the capacitance of the touch node is acquired for once at an interval of 8.33 ms, and ten times of parameter values within the preset normal range can be acquired in a period of historical time as the historical parameter values. Then the step S22 of calculating the average value of the plurality of historical parameter values and setting the average value of the plurality of historical parameter values as the reference value is executed. Following the above-mentioned example, an arithmetic average value of the ten times of parameter values as acquired can be calculated, and then the arithmetic average value is set as a reference value. Therefore, the set reference value can be more accurate. Certainly, the reference value can be reset at an interval of a period of time according to methods shown in steps S21 to S22 so as to update the reference value.

After the reference value is set, the step S23 of acquiring the parameter value representing the size of the capacitance of the touch node is executed, and in the step S24, the result obtained by subtracting the reference value from the parameter value is used as the touch parameter, that is, the reference value is subtracted from the parameter value acquired in the step S23 and the difference value result obtained by subtracting the reference value from the parameter value is used as the touch parameter. The parameter value can float, and thus, there may exist great differences among the touch functional parameters of different touch nodes, which is adverse to judgment on a touch event, and differences among the touch parameters can be reduced by using the result obtained by subtracting the reference value from the parameter value as the touch parameter, so as to make judgment on the touch event simpler and more convenient. Certainly, in other embodiments, the reference value can also be set in other modes.

Figure 12:
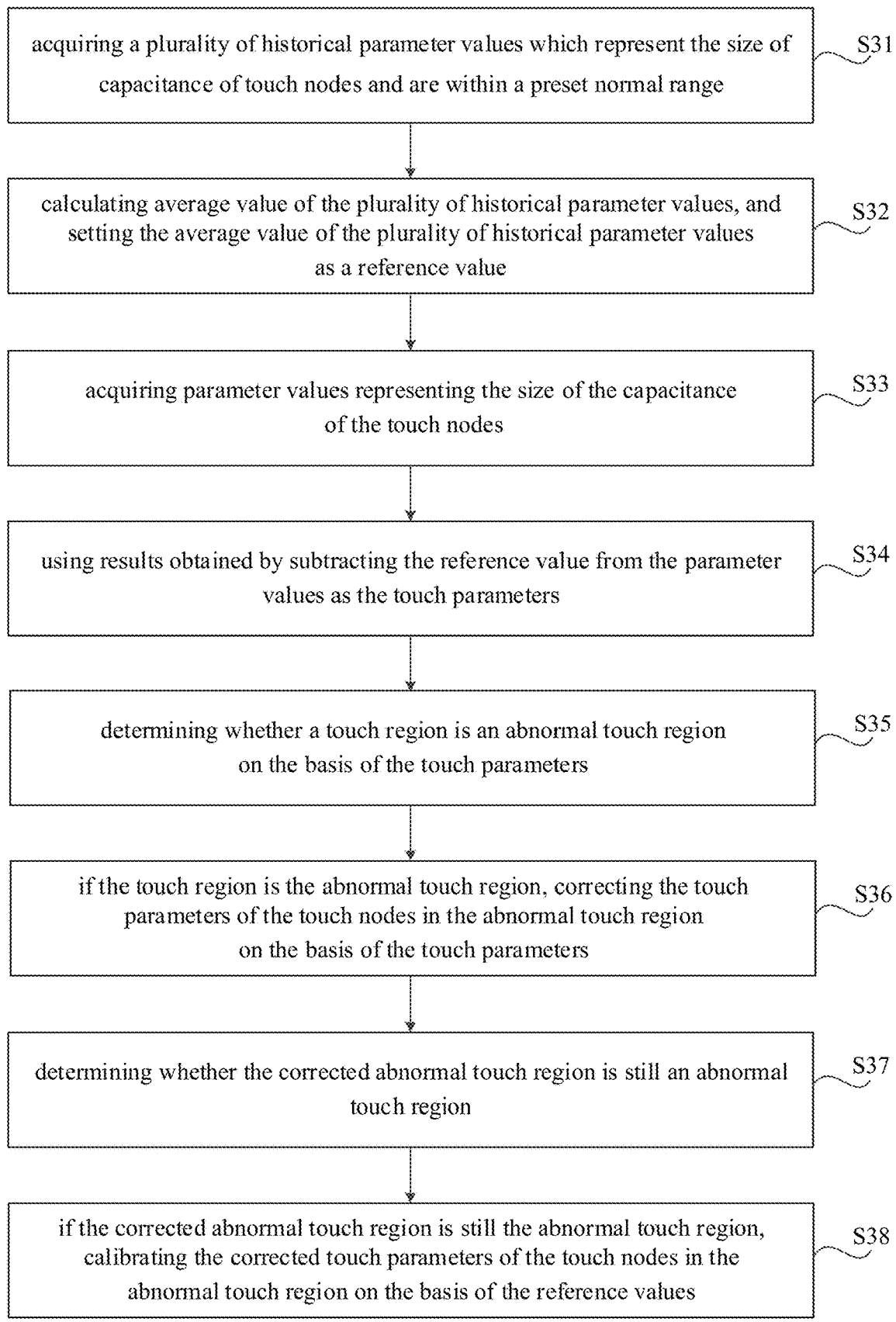
FIG. 12 is yet another flowchart of a method for calibrating a capacitive touch module, according to some embodiments.

FIG. 12 is another flowchart of a method for calibrating a capacitive touch module, according to some embodiments. As shown in FIG. 12, the method includes:

In step S31, a plurality of historical parameter values which represent the size of a capacitance of a touch node and are within a preset normal range are acquired.

In step S32, an average value of the plurality of historical parameter values is calculated, and the average value of the plurality of historical parameter values is set as a reference value.

In step S33, a parameter value representing the size of the capacitance of the touch node is acquired.

In step S34, a result obtained by subtracting the reference value from the parameter value is used as the touch parameter.

In step S35, it is determined whether a touch region is an abnormal touch region on the basis of the touch parameter.

In step S36, the touch parameters of the touch nodes in the abnormal touch region are corrected on the basis of the touch parameters, if the touch region is the abnormal touch region so as to enable the touch parameters of the touch nodes in the abnormal touch region to be within the preset normal range.

In step S37, it is determined whether the corrected abnormal touch region is still an abnormal touch region.

In step S38, if the corrected abnormal touch region is still the abnormal touch region, the corrected touch parameters of the touch nodes in the abnormal touch region are calibrated on the basis of the reference value so as to enable the calibrated touch parameters to be within the preset normal range.

After the touch parameters of the touch nodes in the abnormal touch regions are corrected, part of the abnormal touch regions may still have abnormal conditions, and thus, it is determined whether the corrected abnormal touch region is still the abnormal touch region by executing the step S37, and in the step S38, if the corrected abnormal touch region is still the abnormal touch region, the corrected touch parameters of the touch nodes in the abnormal touch region are calibrated on the basis of the reference value so as to be within the preset normal range. For example, when the corrected touch node is calibrated, the size of the reference value can be directly regulated so as to correct the touch parameters to enable the touch parameters to be within the preset normal range, or the reference value can be reconstructed according to the above-mentioned steps S31 to S32. Therefore, abnormality of the touch module can be further reduced.

Figure 13:
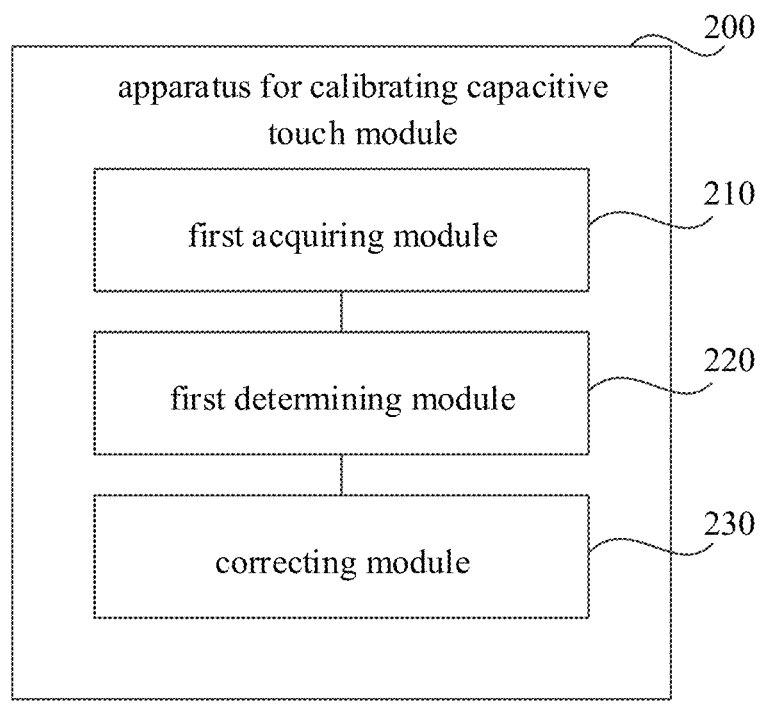
FIG. 13 is a block diagram of an apparatus for calibrating a capacitive touch module, according to some embodiments.

FIG. 13 is a block diagram of an apparatus for calibrating a capacitive touch module, according to some embodiments, the touch module includes a plurality of touch regions, the touch region includes a plurality of touch nodes, and as shown in FIG. 13, the apparatus 200 includes:

a first acquiring module 210, configured to acquire, for any of the touch regions, touch parameters of the touch nodes in the touch region;

a first determining module 220, configured to determine whether the touch region is an abnormal touch region on the basis of the touch parameters; and a correcting module 230, configured to correct the touch parameters of the touch nodes in the abnormal touch region on the basis of the touch parameters, when the touch region is the abnormal touch region, so as to enable the touch parameters of the touch nodes in the abnormal touch region to be within a preset normal range.

In some embodiments, the first determining module 220 includes:

a first determining sub-module, configured to determine whether a number of the touch nodes whose touch parameters are within a preset abnormal range is greater than or equal to a first threshold, and when the number is greater than or equal to the first threshold, determine that the touch region is the abnormal touch region.

In some embodiments, the first determining module 220 includes:

a second determining sub-module, configured to: determine whether a first number of the touch nodes whose touch parameters are within a preset abnormal range is greater than or equal to a first threshold and whether a second number of the touch nodes meeting a preset condition is greater than a second threshold, the preset condition including that a difference value between the touch parameters of the adjacent touch nodes is less than or equal to a third threshold; and when the first number is greater than or equal to the first threshold and the second number is greater than the second threshold, determine that the touch region is the abnormal touch region.

In some embodiments, the first acquiring module 210 includes:

an acquiring sub-module, configured to acquire a parameter value representing a size of a capacitance of the touch node; and a setting sub-module, configured to use a result obtained by subtracting a reference value from the parameter value as the touch parameter.

In some embodiments, the apparatus 200 further includes:

a second acquiring module, configured to acquire a plurality of historical parameter values which represent the size of the capacitance of the touch nodes and are within the preset normal range; and a calculating setting module, configured to calculate an average value of the plurality of historical parameter values, and set the average value of the plurality of historical parameter values as the reference value.

In some embodiments, the apparatus 200 further includes:

a second determining module, configured to determine whether the corrected abnormal touch region is still an abnormal touch region; and a calibrating module, configured to calibrate the corrected touch parameters of the touch nodes in the abnormal touch region on the basis of the reference value, when the corrected abnormal touch region is still the abnormal touch region, so as to enable the calibrated touch parameters to be within the preset normal range.

In some embodiments, the correcting module 230 includes:

a calculating sub-module, configured to calculate an average value of the touch parameters of the touch nodes in the abnormal touch region, of which the parameter values are within the preset abnormal range; and a regulating sub-module, configured to subtract the average value from the touch parameters of the touch nodes in the abnormal touch region, of which the parameter values are within the preset abnormal range.

With respect to the apparatus in the above embodiments, the specific manners for performing operations by individual modules therein have been described in detail in the embodiments regarding the methods, which will not be elaborated herein.

The present disclosure further provides a computer-readable storage medium having stored thereon computer program instructions, when the computer program instructions are executed by a processor, the steps of the method for calibrating the capacitive touch module, which is provided by the present disclosure, are implemented.

Figure 14:
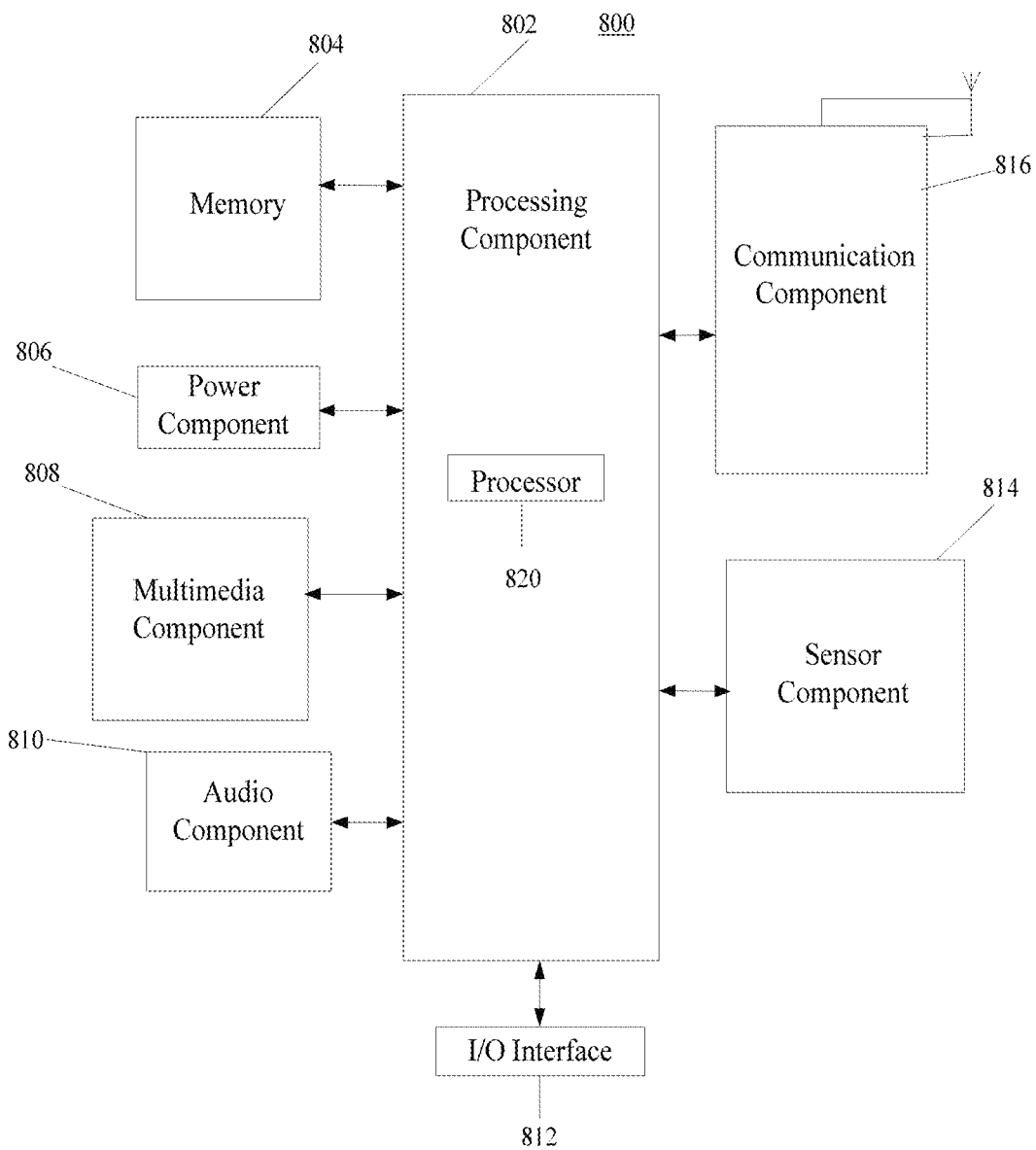
FIG. 14 is another block diagram of an apparatus for calibrating a capacitive touch module, according to some embodiments.

FIG. 14 is another block diagram of an apparatus for calibrating a capacitive touch module, according to some embodiments. For example, the apparatus 800 may be a mobile phone, a computer, a digital broadcast terminal, a messaging device, a gaming console, a tablet, a medical device, fitness equipment, a personal digital assistant, and the like.

Referring to FIG. 14, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to implement all or part of the steps in the above described methods for calibrating the capacitive touch module. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, videos, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 supplies power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and a user. In some embodiments, the screen may include a liquid crystal display (LCD) and a touch panel (TP). In some embodiments, an organic light-emitting diode (OLED) display or other types of displays can be adopted.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 808 includes a front camera and/or a rear camera. The front camera and the rear camera can receive external multimedia data while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 can detect an on/off status of the apparatus 800, relative positioning of components, e.g., the display and a keypad, of the apparatus 800, the sensor component 814 can also detect a change in position of the apparatus 800 or one component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the apparatus 800 and other devices. The apparatus 800 can access a wireless network based on a communication standard, such as Wi-Fi, 2G, 3G, 4G, or 5G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for calibrating the capacitive touch module.

In exemplary embodiments, there is also provided a non-transitory computer-readable storage medium including instructions, such as the memory 804 including the instructions executable by the processor 820 in the apparatus 800, for performing the above-described methods for calibrating the capacitive touch module. For example, the non-transitory computer-readable storage medium can be a ROM, a RAM, a CD-ROM, a magnetic tape, a floppy disc, an optical data storage device, and the like.

Various embodiments of the present disclosure can have one or more of the following advantages.

The touch parameters of the touch nodes in the touch region can be acquired; whether the touch region is the abnormal touch region is determined on the basis of the touch parameter; and if the touch region is the abnormal touch region, the touch parameters of the touch nodes in the abnormal touch region is corrected on the basis of the touch parameters so as to be within the preset normal range. Namely, after the abnormal touch region of the touch module is determined, the touch parameters of the touch nodes in the abnormal touch region is corrected on the basis of the acquired touch parameters so as to be within the preset normal range, thereby reducing the probability of abnormality of the touch module.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for calibrating a capacitive touch module, wherein the touch module includes a plurality of touch regions including a plurality of touch nodes, the method comprising:
    acquiring, for any of the plurality of touch regions, touch parameters of the plurality of touch nodes in the touch region;
    determining whether the touch region is an abnormal touch region on the basis of the touch parameters; and
    correcting the touch parameters of the touch nodes in the abnormal touch region on the basis of the touch parameters, responsive to that the touch region is the abnormal touch region, so as to enable the touch parameters of the touch nodes in the abnormal touch region to be within a preset normal range,
    wherein the determination whether the touch region is the abnormal touch region on the basis of the touch parameters comprises:
    determining whether a number of the touch nodes whose touch parameters are within a preset abnormal range is greater than or equal to a first threshold, and when the number of the touch nodes is greater than or equal to the first threshold, determining that the touch region is the abnormal touch region.

2. The method of claim 1, wherein the determining whether the touch region is the abnormal touch region on the basis of the touch parameters comprises:
    determining whether a first number of the touch nodes whose touch parameters are within a preset abnormal range is greater than or equal to a first threshold, and whether a second number of the touch nodes meeting a preset condition is greater than a second threshold, the preset condition including that a difference value between the touch parameters of the adjacent touch nodes is less than or equal to a third threshold; and
    when the first number is greater than or equal to the first threshold and the second number is greater than the second threshold, determining that the touch region is the abnormal touch region.

3. The method of claim 1, wherein the acquiring the touch parameters of the touch nodes in the touch region comprises:
    acquiring a parameter value representing a size of a capacitance of the touch node; and
    using a result obtained by subtracting a reference value from the parameter value as the touch parameter.

4. The method of claim 3, wherein before the using the result obtained by subtracting the reference value from the parameter value as the touch parameter, the method further comprises:
    acquiring a plurality of historical parameter values which represent the size of the capacitance of the touch node and are within the preset normal range; and
    calculating an average value of the plurality of historical parameter values, and setting the average value of the plurality of historical parameter values as the reference value.

5. The method of claim 3, wherein after the correcting the touch parameters of the touch nodes in the abnormal touch region on the basis of the touch parameters, the method further comprises:
    determining whether the corrected abnormal touch region is still an abnormal touch region; and
    calibrating the corrected touch parameters of the touch nodes in the abnormal touch region on the basis of the reference value when the corrected abnormal touch region is still the abnormal touch region, so as to enable the calibrated touch parameters to be within the preset normal range.

6. The method of claim 1, wherein the correcting the touch parameters of the touch nodes in the abnormal touch region on the basis of the touch parameters comprises:
    calculating an average value of the touch parameters of the touch nodes in the abnormal touch region, of which the parameter values are within the preset abnormal range; and
    subtracting the average value from the touch parameters of the touch nodes in the abnormal touch region, of which the parameter values are within the preset abnormal range.

7. A non-transitory computer-readable storage medium having stored thereon computer program instructions for execution by a processing circuit to implement operations of the method of claim 1.

8. A mobile phone implementing the method of claim 1, comprising a display screen having the plurality of touch regions, wherein the display screen comprises a liquid-crystal display (LCD) or organic light-emitting diode (OLED) display screen.

9. The mobile phone of claim 8, wherein the mobile phone is configured to scan sequentially according to a certain sequence to acquire the touch parameters of the touch nodes in each touch region based on a Touch and Display Driver Integration (TDDI).

10. The mobile phone of claim 9, wherein the touch parameters reflect a capacitance value of the corresponding touch node.

11. The mobile phone of claim 10, wherein the touch parameters of the touch node is calculated based on: Diff=Rawdata−Baseline, where Diff represents the touch parameters, Rawdata represents a voltage parameter corresponding to the capacitance value detected by the touch node, and is positively correlated with the capacitance value, and Baseline represents a reference value.

12. An apparatus for calibrating a capacitive touch module, wherein the touch module comprises a plurality of touch regions, and the touch region comprises a plurality of touch nodes, the apparatus comprising:
  a processor; and
  memory for storing instructions executable by the processor;
  wherein the processor is configured to:
  acquire, for any of the touch regions, touch parameters of the touch nodes in the touch region;
  determined whether the touch region is an abnormal touch region on the basis of the touch parameters; and
  correct the touch parameters of the touch nodes in the abnormal touch region on the basis of the touch parameters, when the touch region is the abnormal touch region, so as to enable the touch parameters of the touch nodes in the abnormal touch region to be within a preset normal range,
  wherein the processor is further configured to:
  determined whether a number of the touch nodes whose touch parameters are within a preset abnormal range is greater than or equal to a first threshold, and when the number of the touch nodes is greater than or equal to the first threshold, determine that the touch region is the abnormal touch region.

13. The apparatus of claim 12, wherein the processor is further configures to:
  determine whether a first number of the touch nodes whose touch parameters are within a preset abnormal range is greater than or equal to a first threshold, and whether a second number of the touch nodes meeting a preset condition is greater than a second threshold, the preset condition including that a difference value between the touch parameters of the adjacent touch nodes is less than or equal to a third threshold; and
  when the first number is greater than or equal to the first threshold and the second number is greater than the second threshold, determine that the touch region is the abnormal touch region.

14. The apparatus of claim 12, wherein the processor is further configured to:
  acquire a parameter value representing a size of a capacitance of the touch node; and
  use a result obtained by subtracting a reference value from the parameter value as the touch parameter.

15. The apparatus of claim 14, wherein the processor is further configured to:
  acquire a plurality of historical parameter values which represent the size of the capacitance of the touch nodes and are within the preset normal range; and
  calculate an average value of the plurality of historical parameter values, and set the average value of the plurality of historical parameter values as the reference value.

16. The apparatus of claim 14, wherein the processor is further configured to:
  determine whether the corrected abnormal touch region is still an abnormal touch region; and
  calibrate the corrected touch parameters of the touch nodes in the abnormal touch region on the basis of the reference value, when the corrected abnormal touch region is still the abnormal touch region, so as to enable the calibrated touch parameters to be within the preset normal range.

17. The apparatus of claim 12, wherein the processor is further configured to:
  calculate an average value of the touch parameters of the touch nodes in the abnormal touch region, of which the parameter values are within the preset abnormal range; and
  subtract the average value from the touch parameters of the touch nodes in the abnormal touch region, of which the parameter values are within the preset abnormal range.

* * * * *